Patented Feb. 7, 1939

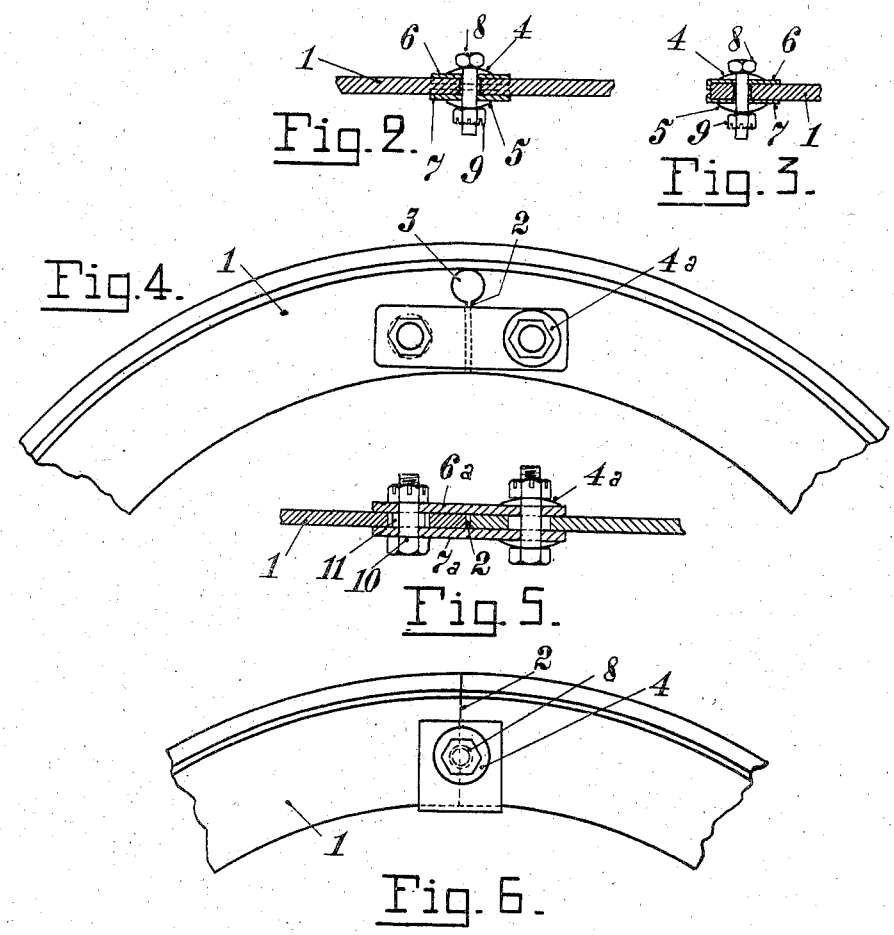

2,146,208

UNITED STATES PATENT OFFICE 2,146,208

DRUM BRAKE FOR AUTOMOBILE VEHICLES

Pierre Farkas, Paris, France

Application March 26, 1937, Serial No. 133,256
In France September 6, 1935

2 Claims. (Cl. 188—250)

The present invention has for its subject improvements in drum brake devices and especially to the device forming the subject of application Serial No. 98,414 filed August 28, 1936, and is a continuation-in-part of said application.

It is well known that the rigidity of the shoes constitutes an obstacle to the efficient operation of these brakes and that various means for adjusting the position of these shoes have been provided for ensuring efficient operation.

The object of the invention is to provide a device which enables a certain deformation to be imparted to the shoes by means of a notch provided in the shoe so as to act on this notched zone.

The device which forms the subject of the invention is shown by way of example in the accompanying drawings, wherein:—

Figs. 2 and 3 are respectively views in longitudinal and cross-section taken through the slot of the shoe of Fig. 1.

Figure 1:
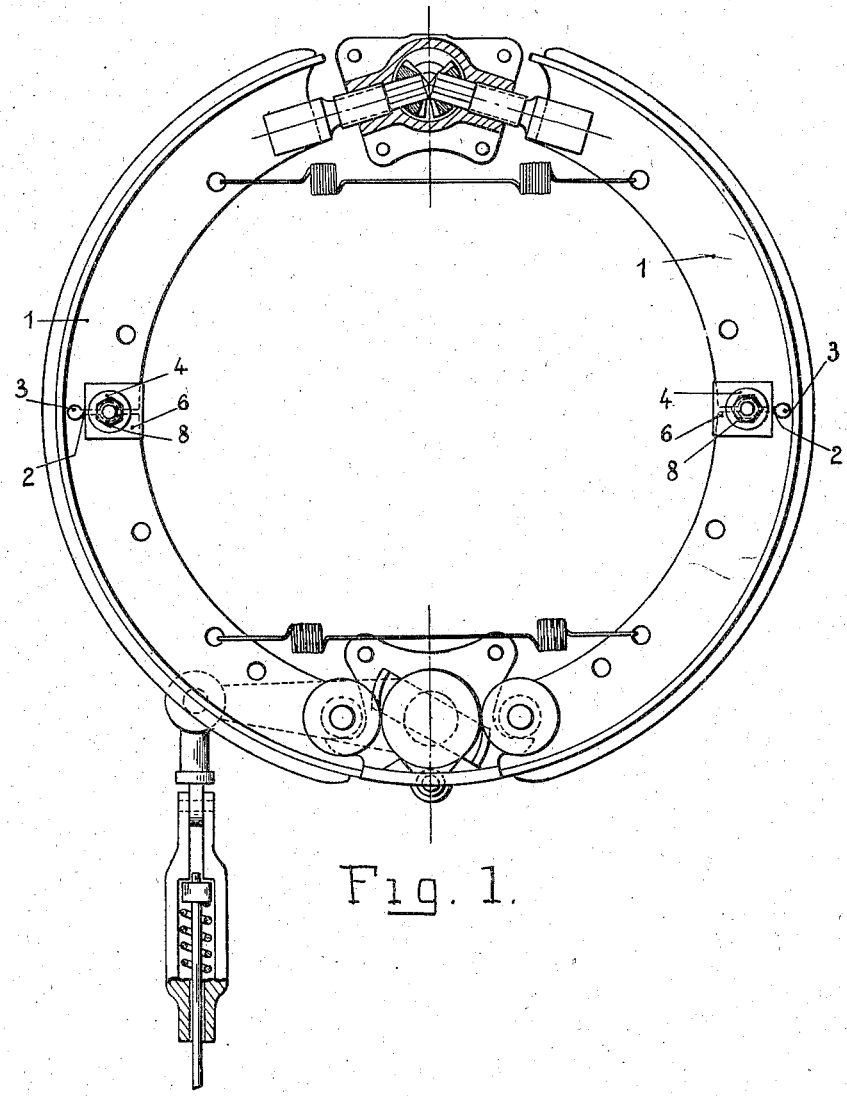
Fig. 1 is a view in elevation of a brake shoe embodying this device.

Fig. 4 relates to a modification of the form of construction shown in Figs. 1, 2 and 3.

Fig. 5 is a longitudinal section corresponding to Fig. 4.

Fig. 6 is a view in elevation relating to another modification of the form of construction shown in Figs. 1, 2 and 3.

According to the invention there is provided in the brake shoe 1, from its inner edge, a slot 2 terminating for example in a circular hole 3. Over this slot and on opposite sides of the shoe there are provided two resilient members, formed for example by washers 4 and 5, bearing respectively against plates 6 and 7, and, through a hole provided in the slot, there is fitted a bolt 8 provided with a nut 9.

It will be understood that by tightening of suitable intensity there is obtained the following result that is to say when the shoe 1, for example in proportion to the wear thereof, tends to open (enlarging the slot 2) the tightening produced by the locked washers prevents the shoe from returning into its initial position, which enables the shoe to conform with the surface against which it bears.

In a modification of this form of construction shown in Figs. 4 and 5, instead of providing a single locking member directly over the slot, the locking member 4a is placed at a certain distance from the slot, the two plates 6a and 7a, extending over the slot and being held on the other side of the slot by a bolt 10 which is fitted with a certain amount of play in a hole 11 provided for this purpose in the shoe.

Finally as shown in Fig. 6, the slot, instead of extending only partially through the body of the shoe, extends from one side to the other. In other words the shoe is divided into two parts and a locking member of the type described is arranged across the section which has been provided.

I claim:

1. A brake shoe for brake drums, comprising a curved drum-engaging member, a reinforcing web having a substantially radially extending slot formed therein and opening in the inner edge of said web to permit deformation of the drum-engaging member upon application of the shoe against the drum by opening of said slot, and means engaging the web on both sides of the slot for maintaining said slot in opened condition after release of the shoe for engagement with the drum.

2. A brake shoe for brake drums, comprising a curved drum-engaging member, a reinforcing web having a substantially radially extending slot formed therein and opening in the inner edge of said web to permit deformation of the drum-engaging member upon application of the shoe against the drum by opening of said slot, and means for elastically compressing the web on each side of the slot comprising two elastic washers positioned on each side of the web at the slot, a plate positioned between each washer and the web, a screw-threaded bolt extending through the slot in the web and through said washers and plates, and a nut on said bolt to vary the gripping action of the washers on the web to enable said washers to retain said slot in an open position which it assumes upon application of the shoe againt said drum.

PIERRE FARKAS.